United States Patent Office 2,816,816
Patented Dec. 17, 1957

2,816,816

PRODUCTION OF ANHYDROUS FLUOTITANATES

Ralph B. Jackson, Bronx, N. Y., and Donald H. Kelly, Gladstone, N. J., assignors to Allied Chemical & Dye Corporation, New York, N. Y., a corporation of New York No Drawing. Application February 24, 1956, Serial No. 567,477

4 Claims. (Cl. 23—51)

This invention relates to the production of anhydrous fluotitanates by the direct reaction of anhydrous gaseous titanium tetrafluoride and anhydrous solid fluorides.

The preparation of fluotitanates by the reaction of the oxide, hydroxide or carbonate of a particular metal with a solution of titanium oxide in excess hydrofluoric acid is well known. The fluotitanate salts which are so produced are in hydrated form. Dehydration of these hydrated fluotitanates tends to cause hydrolysis of the fluotitanates with concomitant oxygen contamination which is highly objectionable in certain important applications, such as in the manufacture of titanium metal by electrolysis of fluotitanates. Further, the production of the anhydrous salts from the hydrated products often requires considerable care to prevent the loss of titanium tetrafluoride at high dehydration temperatures.

The object of the present invention is to provide a simple and economical process for preparing anhydrous fluotitanates whereby an oxygen-free product is directly produced without the necessity for further purification. Other objects and advantages of the invention will appear hereinafter.

In accordance with the present invention, anhydrous fluotitanates are produced by reacting an anhydrous solid fluoride with anhydrous gaseous titanium tetrafluoride at a temperature of about 325° C. to about 475° C. and in the absence of water.

According to a preferred embodiment of the present invention, the gaseous titanium tetrafluoride is gradually added to the solid fluoride in a reactor with agitation of the reaction mass. The total quantity of titanium tetrafluoride used is at least that theoretically required to convert all of the fluoride to fluotitanate.

The sole charge required in carrying out the process of the present invention comprises anhydrous gaseous titanium tetrafluoride and an anhydrous solid fluoride. As exemplified by the reaction between titanium tetrafluoride and potassium fluoride, the process may be represented by the following equation:

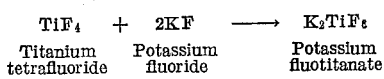

$$TiF_4 + 2KF \longrightarrow K_2TiF_6$$

Titanium tetrafluoride    Potassium fluoride    Potassium fluotitanate

Anhydrous gaseous titanium tetrafluoride may be readily obtained by heating anhydrous solid titanium tetrafluoride in a suitable sublimer. The sublimed gaseous titanium tetrafluoride may then be carried to the reactor by means of any suitable inert gas such as nitrogen, helium and argon. When the sublimer is held at a temperature of about 285° to 300° C., we have found that the amount of gaseous titanium tetrafluoride required to completely convert the fluoride to fluotitanate can be added over a period of about 1 hour or less.

Any anhydrous solid fluoride may be employed in the process of the present invention. The alkali metal fluorides such as potassium fluoride are particularly suitable reactants. We have found it desirable to introduce with the fluoride product fluotitanate in amount about 40% or more by weight of the fluoride in order to reduce lumping of the fluoride during the reaction.

In order to avoid hydrolysis of the fluotitanate and resultant oxygen contamination, it is extremely important that no water be present during the entire reaction. Thus, in accordance with the present invention, water is neither added nor formed at any stage of the process. Of course, it is recognized that it is sometimes difficult to obtain absolutely completely water-free reactants; hence, minute but insignificant quantities of water may be present during the reaction.

The present reaction takes place at temperatures of about 325° C. to about 475° C., preferably about 350° C. to 450° C. When the reaction is carried out at temperatures substantially below 325° C., titanium tetrafluoride condenses on the solid fluoride without combining. When the reaction is carried out at temperatures substantially in excess of 475° C., the reacting material almost completely fuses and sticks to the agitator blades and sides of the reactor.

The sole reaction product of the process of the present invention comprises the desired anhydrous fluotitanate which may be used as such without further purification. The product so produced contains no oxygen, thereby permitting its use in the manufacture of titanium metal.

The present invention may be illustrated by the following example in which parts are by weight:

Example 100 parts of a 50–50 mixture of anhydrous potassium fluoride and anhydrous potassium fluotitanate was introduced into a horizontally-mounted, electrically-heated steel reactor provided with an agitator. Anhydrous solid titanium tetrafluoride was charged to a copper sublimer heated by a Rose metal bath. The copper sublimer was attached to a cylinder which supplied nitrogen gas for carrying sublimed titanium tetrafluoride to the reactor. The sublimer was heated to a temperature of 285° C. with nitrogen gas passing through at a low flow rate. The sublimed material was passed into the reactor which was heated to a temperature of 410° C. After 1 hour the sublimation of titanium tetrafluoride was stopped and the reactor was allowed to cool to room temperature. 70 parts of titanium tetrafluoride sublimed, and 55 parts of the sublimed titanium tetrafluoride was absorbed by the potassium fluoride. This represented a potassium fluotitanate yield of about 103% of theory. X-ray analysis of the product showed no free potassium fluoride present, indicating complete conversion of the fluoride to fluotitanate.

The foregoing description and example are intended to be illustrative only. Any modification of or variation therefrom which conforms to the spirit of the invention is intended to be included within the scope of the claims.

We claim:

1. The process of producing anhydrous alkali metal fluotitanates in which the titanium has a valence of 4 which comprises treating an anhydrous solid alkali metal fluoride with anhydrous gaseous titanium tetrafluoride, in mol ratio of at least about 1 mol of titanium tetrafluoride for every 2 mols of alkali metal fluoride, at a temperature of about 325° C. to about 475° C. and in the absence of water, whereby said alkali metal fluoride and titanium tetrafluoride react to produce an anhydrous alkali metal fluotitanate in which the titanium has a valence of 4, and recovering said anhydrous alkali metal fluotitanate.

2. The process of producing anhydrous alkali metal fluotitanates in which the titanium has a valence of 4 which comprises treating an anhydrous solid alkali metal fluoride with anhydrous gaseous titanium tetrafluoride, in mol ratio of at least about 1 mol of titanium tetrafluoride for every 2 mols of alkali metal fluoride, at a temperature of about 350° C. to about 450° C. and in the absence of water, whereby said alkali metal fluoride and titanium tetrafluoride react to produce an anhydrous alkali metal fluotitanate in which the titanium has a valence of 4, and recovering said anhydrous alkali metal fluotitanate.

3. The process of producing anhydrous potassium fluotitanate in which the titanium has a valence of 4 which comprises treating anhydrous potassium fluoride with anhydrous gaseous titanium tetrafluoride, in mol ratio of at least about 1 mol of titanium tetrafluoride for every 2 mols of potassium fluoride, at a temperature of about 325° C. to about 475° C. and in the absence of water, whereby said potassium fluoride and titanium tetrafluoride react to produce anhydrous potassium fluotitanate in which the titanium has a valence of 4, and recovering said anhydrous potassium fluotitanate.

4. The process of producing anhydrous potassium fluotitanate in which the titanium has a valence of 4 which comprises treating anhydrous potassium fluoride with anhydrous gaseous titanium tetrafluoride, in mol ratio of at least about 1 mol of titanium tetrafluoride for every 2 mols of potassium fluoride, at a temperature of about 350° C. to about 450° C. and in the absence of water, whereby said potassium fluoride and titanium tetrafluoride react to produce anhydrous potassium fluotitanate in which the titanium has a valence of 4, and recovering said anhydrous potassium fluotitanate.

References Cited in the file of this patent
UNITED STATES PATENTS

| | | |
|---|---|---|
| 2,475,287 | Kawecki | July 5, 1949 |
| 2,723,182 | Sibert et al. | Nov. 8, 1955 |

OTHER REFERENCES

Hoffman's Lexikon der Anorganischen Verbindugen, Band 1, 2, 2 Hälfte, 1919, Germany, page 1332.